(12) United States Patent
Takahashi

(10) Patent No.: US 8,295,685 B2
(45) Date of Patent: Oct. 23, 2012

(54) CONTENT REPRODUCTION DEVICE AND METHOD, RECORDING MEDIUM, AND PROGRAM

(75) Inventor: Yoshikazu Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 820 days.

(21) Appl. No.: 12/429,213

(22) Filed: Apr. 24, 2009

(65) Prior Publication Data

US 2009/0208182 A1 Aug. 20, 2009

Related U.S. Application Data

(63) Continuation of application No. 10/479,928, filed on Aug. 12, 2004, now Pat. No. 7,546,021.

(30) Foreign Application Priority Data

Apr. 9, 2002 (JP) ................................ P2002-106803

(51) Int. Cl.
   *G11B 27/00* (2006.01)
(52) U.S. Cl. ........................................ 386/278; 386/239
(58) Field of Classification Search .................. 386/239, 386/278, 282–284
   See application file for complete search history.

(56) References Cited

U.S. PATENT DOCUMENTS

| 5,900,904 A | 5/1999 | Okada et al. |
| 5,953,481 A | 9/1999 | Watanabe et al. |
| 6,546,189 B1 | 4/2003 | Koda |
| 6,600,699 B2 | 7/2003 | Miyazaki |
| 6,771,887 B1 | 8/2004 | Okawa et al. |
| 2002/0049710 A1 | 4/2002 | Kusumoto |
| 2002/0131760 A1* | 9/2002 | Hirai et al. ...................... 386/52 |
| 2003/0049014 A1 | 3/2003 | Siddiqui |
| 2003/0188154 A1 | 10/2003 | Dallard et al. |

FOREIGN PATENT DOCUMENTS

| EP | 1 050 880 | 11/2000 |
| EP | 1 126 462 | 8/2001 |
| JP | 6-338170 | 12/1994 |
| JP | 10-322647 | 12/1998 |
| JP | 11-213522 | 8/1999 |
| JP | 2000-23090 | 1/2000 |
| JP | 2002-16866 | 1/2002 |
| WO | WO 99/38169 | 7/1999 |

* cited by examiner

*Primary Examiner* — Thai Tran
*Assistant Examiner* — Mishawn Dunn
(74) *Attorney, Agent, or Firm* — Frommer Lawrence & Haug LLP; William S. Frommer; Ellen Marcie Emas

(57) ABSTRACT

The present invention relates to an apparatus and a method for content reproduction, a recording medium, and a program that make it possible to edit taken images easily and automatically in accordance with an intention of an editor. Each time a reproduction is performed, a reproduction start point and a reproduction end point of VOBU units of images reproduced by a disk camcorder are recorded in Play Data 81. The recorded reproduction start point and reproduction end point are read, and edit points representing a reproduced section of a longest, a shortest, or an average length are obtained. The obtained edit points are registered in a UD_PGCIT 94. Scenes are reproduced in order on the basis of the edit point data in the UD_PGCIT 94, and thus automatic edit reproduction is performed. The present invention is applicable to disk camcorders.

23 Claims, 12 Drawing Sheets

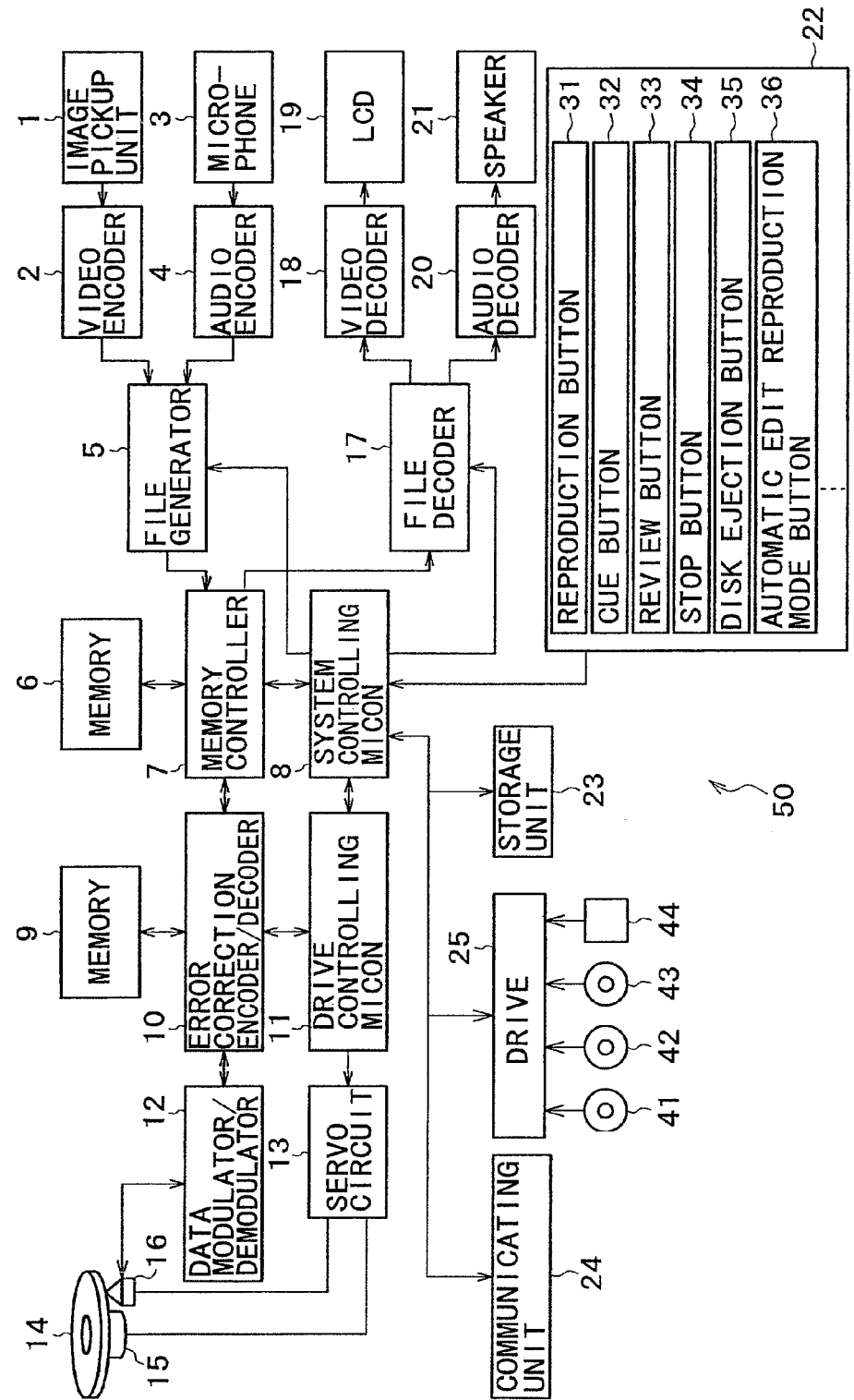

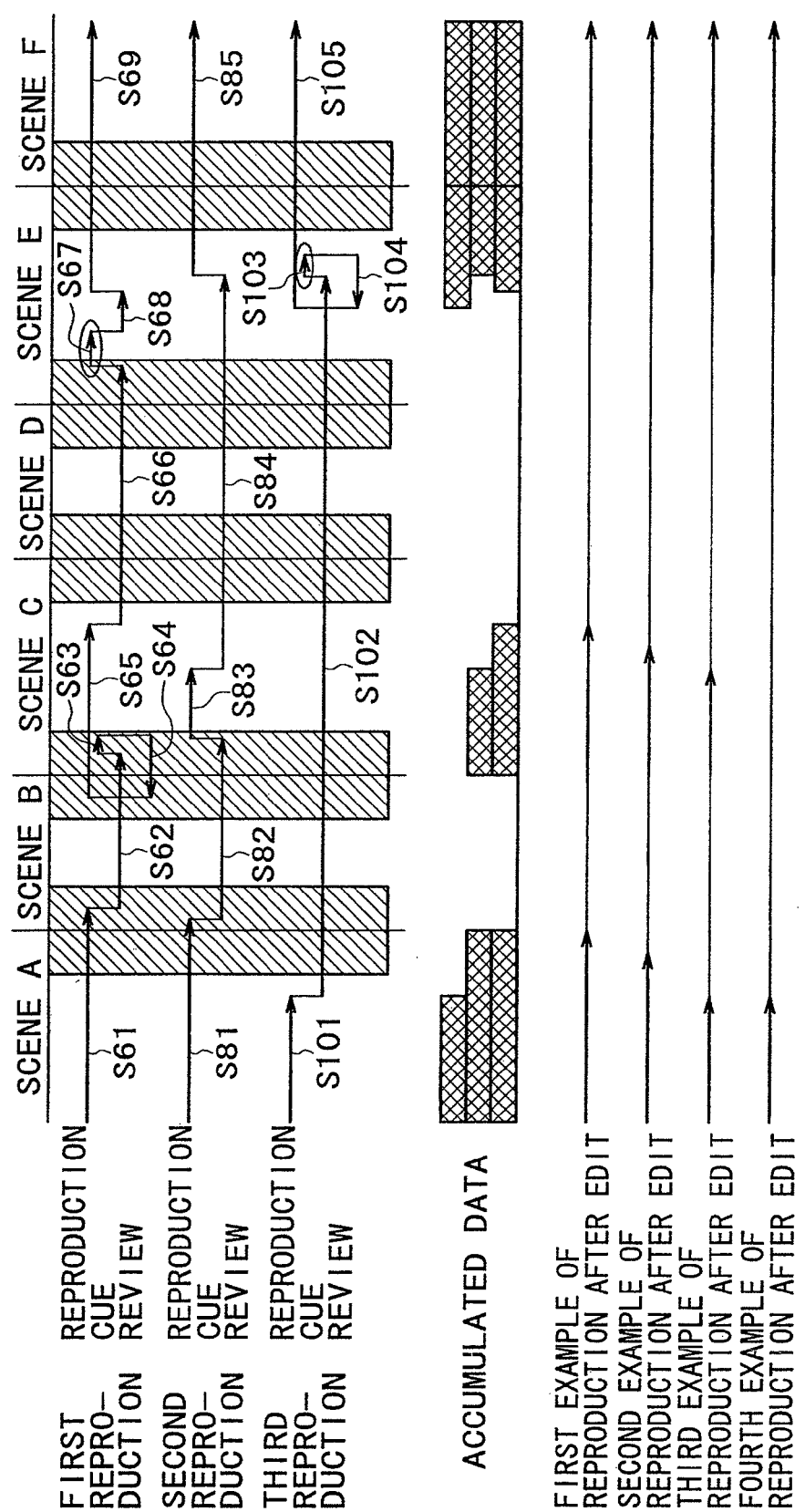

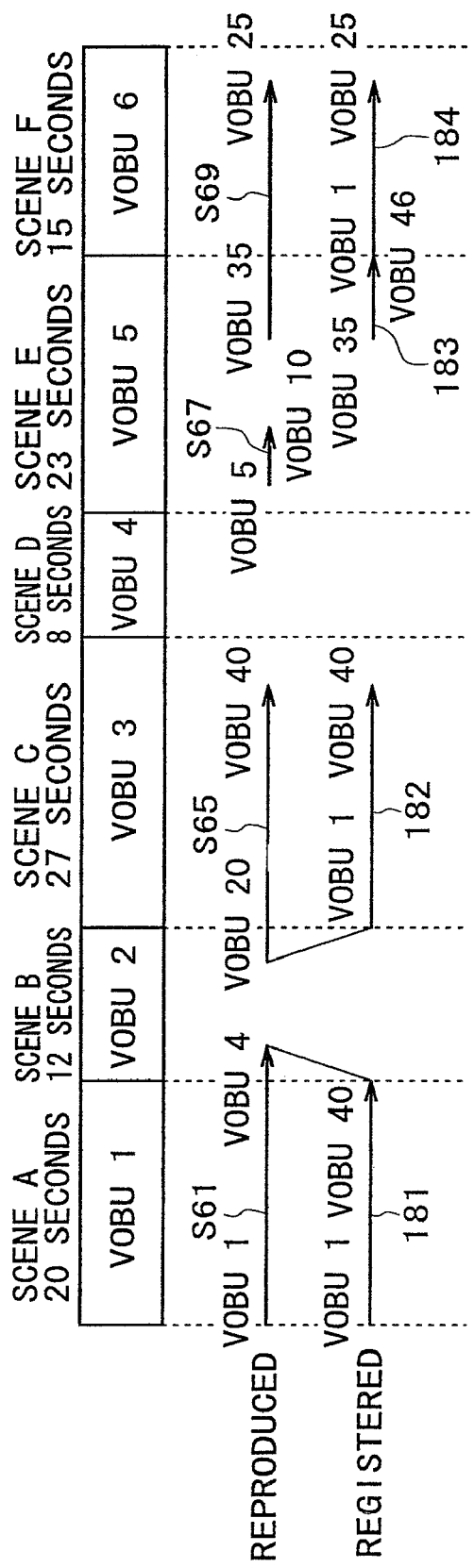

F I G. 1 1
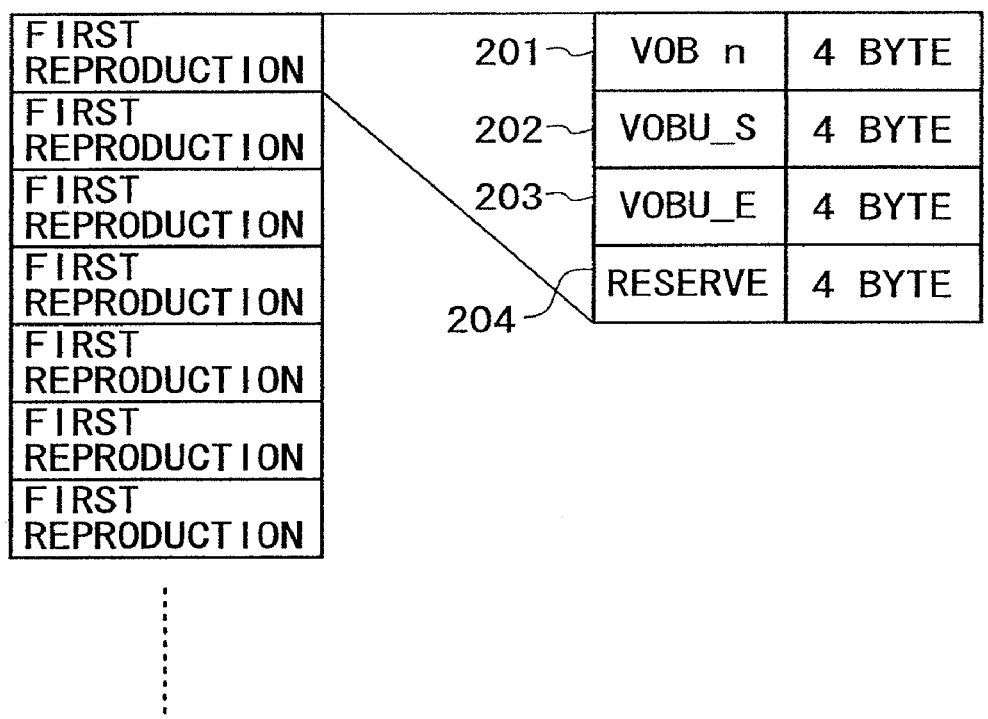

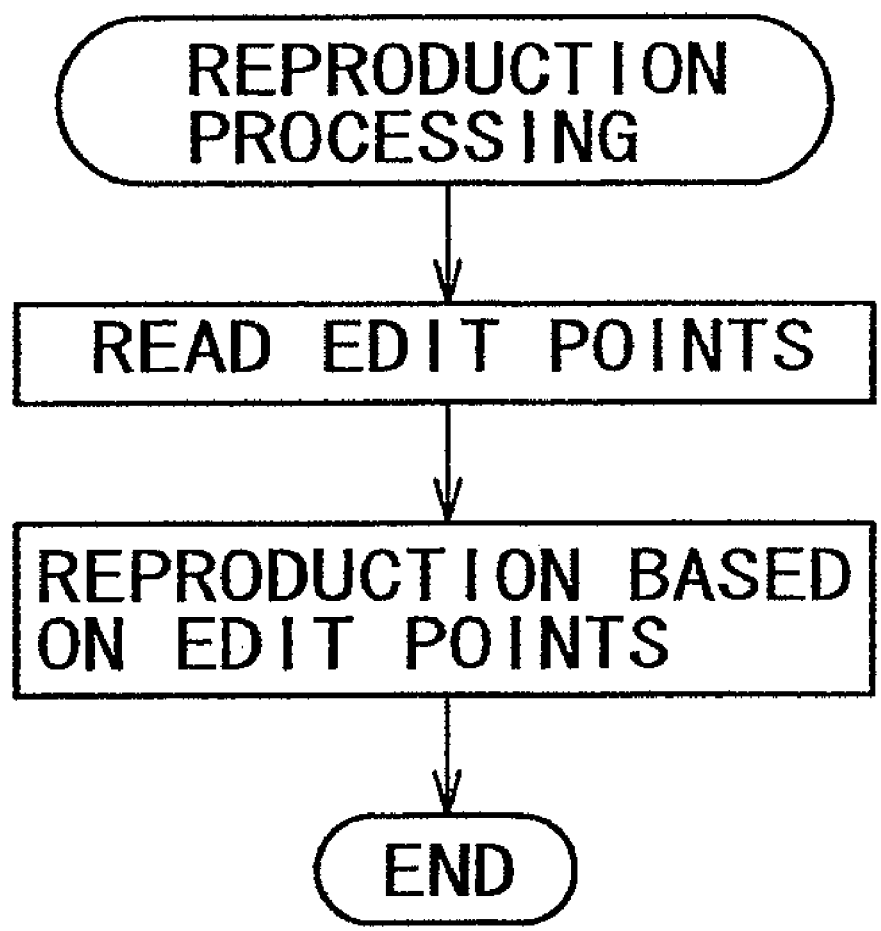

CONTENT REPRODUCTION DEVICE AND METHOD, RECORDING MEDIUM, AND PROGRAM

This is a continuation of application Ser. No. 10/479,928, filed Aug. 12, 2004, now U.S. Pat. No. 7,546,021, which is entitled to the priority filing date of Japanese application 2002-106803 filed on Apr. 9, 2002, the entirety of which is incorporated herein by reference.

TECHNICAL FIELD

The present invention relates to an apparatus and a method for content reproduction, a recording medium, and a program, and particularly to an apparatus and a method for content reproduction, a recording medium, and a program that make it possible to easily perform automatic editing reflective of an intention of an editor.

BACKGROUND ART

The automatic editing of an image file taken by a video camera is realized by many software programs.

Such conventional software for automatic editing performs automatic editing by selecting scenes on predetermined judging conditions on the basis of contents (shooting states) read from shooting data such as scene change, a shooting time for one scene, scenes with motion, scenes without motion, bright scenes, and dark scenes, irrespective of an intention of a photographer.

However, such conventional automatic editing is performed mainly on the basis of information on taken images. Depending on a manner of shooting, a completed product (edit result) different from one intended by the editor (photographer) is obtained.

Accordingly, a method is proposed in which ranking is performed during shooting or immediately after shooting, the ranking data is recorded as an edit condition on a medium, and automatic editing is performed on the basis of the edit condition.

However, a photographer usually concentrates on shooting operation, and is therefore unable to pay attention to data input. It is therefore difficult to include an intention of the photographer during shooting.

Thus, although automatic editing allows an editor to perform editing with less time and trouble as compared with manual editing, in which the editor specifies an in point and an out point manually, automatic editing is not used very often because a product not reflective of an intention of the editor is often obtained.

On the other hand, although manual editing can accurately reflect the intention of the editor, general users tend to avoid editing because the editing operation is complicated and time-consuming.

DISCLOSURE OF INVENTION

The present invention has been made in view of such a situation, and it is accordingly an object of the present invention to perform editing in accordance with an intention of an editor easily and automatically.

According to the present invention, there is provided a content reproducing apparatus characterized by comprising: first determining means for determining whether reproduction of a content is started; first detecting means for detecting a reproduction start position when the first determining means determines that the reproduction of the content is started; second determining means for determining whether the reproduction of the content is stopped; second detecting means for detecting a reproduction end position when the second determining means determines that the reproduction of the content is stopped; and storing means for storing the reproduction start position and the reproduction end position.

The content reproducing apparatus can further include recording means for recording the reproduction start position and the reproduction end position stored in the storing means onto an information recording medium.

The content reproducing apparatus can further include: reproducing means for reproducing the reproduction start position and the reproduction end position recorded on the information recording medium; and determining means for determining an edit point on the basis of the reproduction start position and the reproduction end position reproduced by the reproducing means.

The determining means can weight a plurality of reproduction start positions and a plurality of reproduction end positions reproduced by the reproducing means and determine the edit point.

The recording means can further record the edit point determined by the determining means onto the information recording medium.

The reproducing means can further reproduce the edit point recorded on the information recording medium and reproduce the content recorded on the information recording medium on the basis of the reproduced edit point.

The first detecting means can determine whether an actual reproduction start position is situated within a predetermined region, and detect a nearest scene start point as the reproduction start position when the first detecting means determines that the actual reproduction start position is situated within the predetermined region.

The second detecting means can determine whether the reproduction end position is situated within a predetermined region, and detect a nearest scene end point as the reproduction end position when the second detecting means determines that the reproduction end position is situated within the predetermined region.

The content reproducing apparatus can further include third determining means for determining whether the time between the reproduction start position and the reproduction end position is longer than a predetermined reference value, wherein the storing means stores the reproduction start position and the reproduction end position when the third determining means determines that the time between the reproduction start position and the reproduction end position is longer than the reference value.

The storing means can be prevented from storing the reproduction start position and the reproduction end position when the third determining means determines that the time between the reproduction start position and the reproduction end position is shorter than the reference value.

According to the present invention, there is provided a content reproducing method characterized by comprising: a first determining step for determining whether reproduction of a content is started; a first detecting step for detecting a reproduction start position when it is determined by processing of the first determining step that the reproduction of the content is started; a second determining step for determining whether the reproduction of the content is stopped; a second detecting step for detecting a reproduction end position when it is determined by processing of the second determining step that the reproduction of the content is stopped; and a storing controlling step for controlling storing the reproduction start position and the reproduction end position.

According to the present invention, there is provided a program on a recording medium, the program characterized by comprising: a first determining step for determining whether reproduction of a content is started; a first detecting step for detecting a reproduction start position when it is determined by processing of the first determining step that the reproduction of the content is started; a second determining step for determining whether the reproduction of the content is stopped; a second detecting step for detecting a reproduction end position when it is determined by processing of the second determining step that the reproduction of the content is stopped; and a storing controlling step for controlling storing the reproduction start position and the reproduction end position.

According to the present invention, there is provided a program for making a computer controlling a content reproducing apparatus perform processing, the processing characterized by comprising: a first determining step for determining whether reproduction of a content is started; a first detecting step for detecting a reproduction start position when it is determined by processing of the first determining step that the reproduction of the content is started; a second determining step for determining whether the reproduction of the content is stopped; a second detecting step for detecting a reproduction end position when it is determined by processing of the second determining step that the reproduction of the content is stopped; and a storing controlling step for controlling storing the reproduction start position and the reproduction end position.

In the present invention, the reproduction start position and the reproduction end position of the content are stored.

BRIEF DESCRIPTION OF DRAWINGS

FIG. 1 is a diagram showing a configuration of an embodiment of a disk camcorder to which the present invention is applied;

FIG. 9 is a diagram showing examples of reproduction patterns;

FIG. 10 is a diagram showing registered data registered in Play Data in FIG. 5;

FIG. 11 is a diagram showing an example of a table of data accumulated in the Play Data in FIG. 5; and FIG. 12 is a flowchart of assistance in explaining reproduction processing of the disk camcorder of FIG. 1 after editing.

BEST MODE FOR CARRYING OUT THE INVENTION

Figure 2:
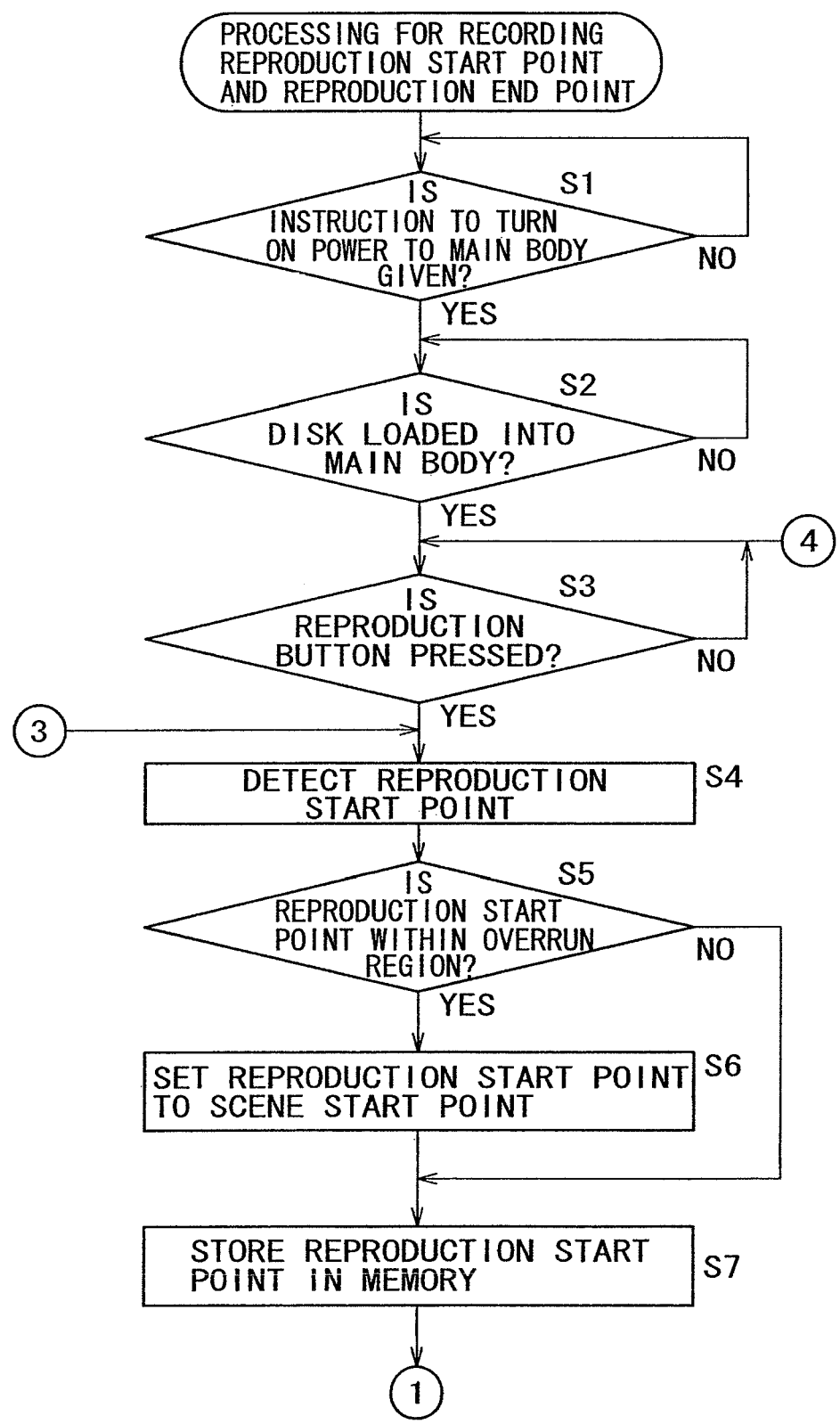
FIG. 2 is a flowchart of assistance in explaining processing of the disk camcorder of FIG. 1 for recording a reproduction start point and a reproduction end point.

An embodiment of the present invention will hereinafter be described with reference to the drawings. FIG. 1 shows a configuration of a disk camcorder 50 to which the present invention is applied.

A video signal from an image pickup unit 1 including an image pickup device such as a CCD (charge-coupled device), a CMOS (complementary metal-oxide semiconductor) or the like is inputted to a video encoder 2. The video encoder 2 compression-codes the video signal inputted thereto. Similarly, an audio signal is inputted from a microphone 3 to an audio encoder 4. The audio encoder 4 compression-codes the audio signal inputted thereto. A method of compression-coding the video signal and the audio signal includes MPEG (Moving Picture Experts Group), for example.

The compression-coded video data and audio data outputted from the video encoder 2 and the audio encoder 4 are supplied to a file generator 5. The file generator 5 is controlled by a system controlling micon (hereinafter "microcomputer" is simply referred to as "micon") 8. The file generator 5 converts the coded video data and audio data into a video elementary stream and an audio elementary stream so that the video data and audio data have a file structure capable of being handled by computer software for reproducing moving pictures and the like in synchronism without using special hardware. Also, the file generator 5 multiplexes the video elementary stream and the audio elementary stream to generate one file.

The file generated by the file generator 5 is sequentially written to a memory 6 via a memory controller 7. When a request to write data onto a disk is inputted from the system controlling micon 8 to the memory controller 7, the memory controller 7 reads the file generated by the file generator 5 from the memory 6. In this case, a coding transfer rate of the file is lower than a transfer rate of data being written to the disk, for example about ½ of the transfer rate of data being written to the disk. Hence, while the file is written to the memory 6 continuously, the file is read from the memory 6 intermittently while the system controlling micon 8 monitors so that the memory 6 does not overflow or underflow.

The file read from the memory 6 via the memory controller 7 is supplied to an error correction encoder/decoder 10. The error correction encoder/decoder 10 once writes the file to a memory 9, subjects the file to interleaving processing, generates redundant data of error correcting code, and then reads the data having the redundant data added thereto from the memory 9. Then, an output of the error correction encoder/decoder 10 is supplied to a data modulator/demodulator 12. When the digital data is recorded onto the disk, the data modulator/demodulator 12 modulates the data so as to. facilitate clock extraction at a time of reproduction and prevent problems such as intersymbol interference and the like.

The data modulator/demodulator 12 outputs a signal for driving an optical pickup 16. The optical pickup 16 applies a laser beam for recording to the optical disk 14. The data is thus recorded on the optical disk 14. The optical disk 14 is rotated by a motor 15 at CLV (constant linear velocity), CAV (constant angular velocity), or ZCAV (zone CLV).

Since the intermittent data read from the memory controller 7 is recorded onto the optical disk 14, continuous recording operation is not performed normally. The recording operation is interrupted after a given amount of data is recorded, and a standby state is maintained until a next recording request. Thus, the recording operation is performed intermittently.

In response to a request from the system controlling micon 8, a drive controlling micon 11 issues a request to a servo circuit 13 to control a disk drive as a whole and thus perform the recording operation. The servo circuit 13 effects servo control of movement in a direction of a radius of the disk, tracking servo control, and focus servo control on the optical pickup 16, and also effects spindle servo control on the motor 15. Further, the system controlling micon 8 is controlled by a user operating an operating input unit 22.

A configuration for reproduction will next be described. After the optical disk 14 such for example as a DVD (Digital Versatile Disk) is loaded into the disk camcorder 50, in response to an input signal from the operating input unit 22 having a reproduction button 31, a cue button 32, a review button 33, a stop button 34, a disk ejection button 35, an automatic edit reproduction mode button 36, and the like, the system controlling micon 8 outputs a request to the drive controlling micon 11, and then the drive controlling micon 11 outputs a request to the servo circuit 13 to control the disk drive as a whole. In reproduction, the optical pickup 16 irradiates the optical disk 14 with a laser beam for reproduction, and converts light reflected from the optical disk 14 into a reproduced signal by a photodetector in the optical pickup 16.

In this case, the servo circuit 13 detects a tracking error and a focus error from an output signal of the photodetector in the optical pickup 16, and effects control to position the reading laser beam on a track and focus the reading laser beam on the track. The servo circuit 13 also controls the movement of the optical pickup 16 in the direction of the radius of the disk to reproduce data at a desired position on the optical disk 14.

The optical pickup 16 supplies the data modulator/demodulator 12 with the reproduced signal at a rate higher than a transfer rate of an image file, for example twice the transfer rate. In this case, continuous reproduction is not performed normally. Intermittent reproduction is performed in which the reproduction operation is interrupted after a given amount of data is reproduced and a standby state is maintained until a next reproduction request.

The data modulator/demodulator 12 demodulates the reproduced signal supplied from the optical pickup 16 to the data modulator/demodulator 12, and then supplies the demodulated reproduced signal to the error correction encoder/decoder 10. The error correction encoder/decoder 10 once writes the demodulated reproduced data to the memory 9, and performs deinterleaving processing and error correction processing. The memory controller 7 writes the reproduced data after the error correction to the memory 6.

The reproduced data written to the memory 6 is outputted to a file decoder 17 in response to a request from the system . . . controlling micon 8 in accordance with synchronization timing in demultiplexing video data and audio data. For continuous reproduction of video data and audio data, the system controlling micon 8 monitors an amount of data reproduced from the optical disk 14 and written to the memory 6 and an amount of data read from the memory 6 and outputted to the file decoder 17, and controls the memory controller 7 and the drive controlling micon 11 to read data from the optical disk 14 such that the memory 6 does not overflow or underflow.

The file decoder 17 separates the reproduced data into a video elementary stream and an audio elementary stream under control of the system controlling micon 8. The video elementary stream is supplied to a video decoder 18, and the audio elementary stream is supplied to an audio decoder 20. The video elementary stream and the audio elementary stream from the file decoder 17 are outputted so as to synchronize with each other.

The video decoder 18 and the audio decoder 20 each perform decoding for compression coding. The video decoder 18 and the audio decoder 20 then output a video output signal to an LCD (liquid crystal display) 19 and an audio output signal to a speaker 21, respectively, whereby video and audio are reproduced.

As described above, the optical disk 14 having data recorded thereon is removable, and is therefore reproducible by another apparatus. For example, a personal computer operating with software for reproducing image data as mentioned above can read the data recorded on the optical disk 14 and reproduce the recorded video and audio data. Further, the present invention is applicable to a case where only video data or only audio data is handled.

In addition, the system controlling micon 8 is connected with a communicating unit 24 for communicating data via a network typified by the Internet and a storage unit 23 formed by a semiconductor memory or the like for storing various data such as a program and the like.

Further, the system controlling micon 8 is connected as required with a drive 25 for reading and writing data from and to a recording medium such as a magnetic disk 41, an optical disk 42, a magneto-optical disk 43, a semiconductor memory 44 or the like.

A computer program for making the disk camcorder 50 perform predetermined operation is supplied to the disk camcorder 50 in a state of being stored on the magnetic disk 41 (including floppy disks), the optical disk 42 (including CD-ROM (Compact Disc-Read Only Memory) and DVD (Digital Versatile Disc)), the magneto-optical disk 43 (including MD (Mini Disc)), or the semiconductor memory 44. The computer program is read by the drive 25 and installed in the semiconductor memory included in the storage unit 23. According to an instruction of the system controlling micon 8 which instruction corresponds to a command inputted from a user to the operating input unit 22, the computer program installed in the storage unit 23 is loaded from the storage unit 23, and then executed.

Processing for recording a reproduction start point and a reproduction end point which processing is performed by an automatic edit processing program of the disk camcorder 50 will next be described with reference to flowcharts of FIGS. 2 to 4.

At a step S1 in FIG. 2, the automatic edit processing program (system controlling micon 8) determines whether an instruction to turn on power to a main body (disk camcorder 50) is given on the basis of a signal from the operating input unit 22. When the automatic edit processing program determines that no instruction to turn on the power to the main body is given, the automatic edit processing program holds the processing at the step S1, and continues the processing until an instruction to turn on the power is given. When the automatic edit processing program determines that an instruction to turn on the power to the main body is given, the automatic edit processing program advances the processing to a step S2.

At the step S2, the automatic edit processing program determines whether an optical disk 14 is loaded into the main body. When the automatic edit processing program determines that no optical disk 14 is loaded into the main body, the automatic edit processing program holds the processing at the step S2, and continues the processing until an optical disk 14 is loaded into the main body. When the automatic edit processing program determines that an optical disk 14 is loaded into the main body, the automatic edit processing program advances the processing to a step S3.

At the step S3, the automatic edit processing program determines whether the reproduction button 31 of the operating input unit 22 is pressed. When the automatic edit processing program determines that the reproduction button 31 is not pressed, the automatic edit processing program holds the processing at the step S3, and continues the processing until the reproduction button 31 is pressed. When the automatic edit processing program determines that the reproduction button 31 is pressed, the automatic edit processing program advances the processing to a step S4 to detect a reproduction start point (a frame at which reproduction is started).

At a step S5, the automatic edit processing program determines whether the reproduction start point is situated within an overrun region (a certain time before and after a scene change point (within about a few seconds)). When the automatic edit processing program determines that the reproduction start point is situated within the overrun region, the automatic edit processing program determines that the difference between the nearest start point of a scene and the reproduction start point is within an error range of operating input by the user. The automatic edit processing program advances the processing to a step S6 to set the reproduction start point to the start point of the scene (set a frame at the start point of the scene as the reproduction start point). Incidentally, length of an optimum overrun region varies depending on response of the apparatus, speed of cue (fast forward) and review (rewind) and the like. That is, the overrun region in this case refers to a distance (time) from an instruction for a stop (or reproduction) given by the user during a cue or review to an actual stop (or reproduction).

When the automatic edit processing program determines at the step S5 that the reproduction start point is not situated within the overrun region (situated outside the overrun region), the processing at the step S6 is skipped.

At a next step S7, the automatic edit processing program stores the reproduction start point in the memory 6. The automatic edit processing program advances the processing to a step S8. At the step S8, the automatic edit processing program determines whether the cue button 32 or the review button 33 of the operating input unit 22 is pressed. When the automatic edit processing program determines that the cue button 32 or the review button 33 is pressed, the automatic edit processing program advances the processing to a step S9 to detect a reproduction end point (a frame being reproduced in timing in which the cue button 32 or the review button 33 is pressed).

At a step S10, the automatic edit processing program determines whether the reproduction end point is situated within an overrun region. When the automatic edit processing program determines that the reproduction end point is situated within the overrun region, the automatic edit processing program at a step S11 determines that the difference between the nearest end point of a scene and the reproduction end point is within an error range of operating input by the user, and sets the reproduction end point to the end point of the scene (sets a frame at the end point of the scene as the reproduction end point).

When the automatic edit processing program determines at the step S10 that the reproduction end point is not situated within the overrun region, the processing at the step S11 is skipped.

At a next step S12, the automatic edit processing program stores the reproduction end point in the memory 6. The automatic edit processing program advances the processing to a step S13. When the automatic edit processing program determines at the step S13 that the stop button 34 is not pressed, the automatic edit processing program advances the processing to a step S21 to determine whether the reproduction button 31 is pressed. When the automatic edit processing program determines that the reproduction button 31 is not pressed, the scene is still in the process of the cue or review, and thus the automatic edit processing program returns the processing to the step S13 and holds the processing until the stop button 34 or the reproduction button 31 is pressed. When the automatic edit processing program determines that the reproduction button 31 is pressed, a scene is reproduced again, and thus the automatic edit processing program returns the processing to the step S4 to perform processing for storing a reproduction start point.

When the automatic edit processing program determines at the step S8 that the cue button 32 or the review button 33 is not pressed, the automatic edit processing program advances the processing to a step S15 to determine whether the stop button 34 of the operating input unit 22 is pressed.

When the automatic edit processing program determines at the step S15 that the stop button 34 is not pressed, the scene is still being reproduced, and thus the automatic edit processing program returns the processing to the step S8 and holds the processing until the cue button 32 or the review button 33 is pressed or until the stop button 34 is pressed (the reproduction is ended).

When the automatic edit processing program determines at the step S15 that the stop button 34 is pressed, the automatic edit processing program determines that the reproduction is ended. At a step S16, the automatic edit processing program detects a reproduction end point (a frame being reproduced in timing in which the stop button is pressed). At a step S17, the automatic edit processing program determines whether the reproduction end point is situated within an overrun region.

When the automatic edit processing program determines at the step S17 that the reproduction end point is situated within the overrun region, the automatic edit processing program determines that the difference between the end point of a scene and the reproduction end point is within an error range of operating input by the user, and advances the processing to a step S18. At the step S18, the automatic edit processing program sets the reproduction end point to the end point of the scene.

When the automatic edit processing program determines at the step S17 that the reproduction end point is not situated within the overrun region, the processing at the step S18 is skipped.

At a next step S19, the automatic edit processing program stores the reproduction end point in the memory 6.

After the processing at the step S19 or when the automatic edit processing program determines at the step S13 that the stop button 34 is pressed, the automatic edit processing program determines at a step S14 whether a time from the reproduction start point to the reproduction end point is three seconds (generally a shortest shooting time) or more. When the automatic edit processing program determines that the time from the reproduction start point to the reproduction end point is three seconds or more, the automatic edit processing program determines that the scene has been reproduced, and then advances to processing at a step S22.

On the other hand, when the automatic edit processing program determines that the time from the reproduction start point to the reproduction end point is not three seconds or more (is less than three seconds), the automatic edit processing program determines that the scene has not been reproduced, and then advances to processing at a step S20 to erase the data of the reproduction start point and the reproduction end point stored at the step S7 and the step S12 or S19. Thereafter the processing proceeds to the step S22.

At the step S22, the automatic edit processing program determines whether the disk ejection button 35 of the operating input unit 22 is pressed. When the automatic edit processing program determines that the disk ejection button 35 is pressed, the automatic edit processing program advances the processing to a step S23.

When the automatic edit processing program determines that the disk ejection button 35 is not pressed, the automatic edit processing program advances the processing to a step S25 to determine whether an instruction to turn off the power to the main body is given. When the automatic edit processing program determines that an instruction to turn off the power to the main body is given, the automatic edit processing program advances the processing to the step S23. When the automatic edit processing program determines at the step S25 that no instruction to turn off the power to the main body is given, the processing returns to the step S3 to repeat the processing from the step S3 on down. That is, the above-described processing is repeated until the disk is ejected from the main body or until the power to the main body is turned off.

At the step S23, the automatic edit processing program records all reproduction start points and reproduction end points registered in the memory 6 in Play Data 81 (to be described later with reference to FIG. 5) of the optical disk 14. Then, at a step S24, the automatic edit processing program ejects the optical disk 14 or turns off the power, and thereby ends the processing.

In a case of a disk camcorder that is operated only when the cue button 32 and the review button 33 are pressed, and is automatically brought into a reproducing state after cue or review, "button is pressed" in the above-described processing means "a state after the button is pressed." That is, for example "is the reproduction button pressed?" means "is the disk camcorder in a reproducing state?."

A structure of a disk file written in the VR format on DVD-RW in the processing of FIGS. 2 to 4 will be described with reference to FIG. 5. In the disk file 110 written in the VR format, a Lead in 61 corresponds to an innermost circumference of the disk, and a Lead out 83 corresponds to an outermost circumference of the disk. The Lead in 61 describes a disk type, a format, a recording method and the like. A UDF (Universal Disk Format) 62 describes a file system. An RTR_VMG (Real Time Recording Video Manager) 63 has various management information of the VR format recorded therein. VOBs (Video Objects) 71 to 77 store real video data and audio data.

The RTR_VMG 63 will be described in detail. The RTR_VMG 63 includes seven information tables. The following four tables pertinent to the present invention will be described below. An RTR_VMGI (Real Time Recording Video Manager Information) 91 describes address information of the information tables within the RTR_VMG 63, a date and time of creation of a play list, a storage location of the list (location of a user-defined PGCI) and other basic information related to Real Time Recording. An M_AVFIT (Movie AV File Information Table) 92 describes video attributes such for example as a VOB compression format, aspect ratio, and resolution, audio attributes such for example as a compression format, a number of channels, and transfer rate, and Time Map information.

Figure 6:
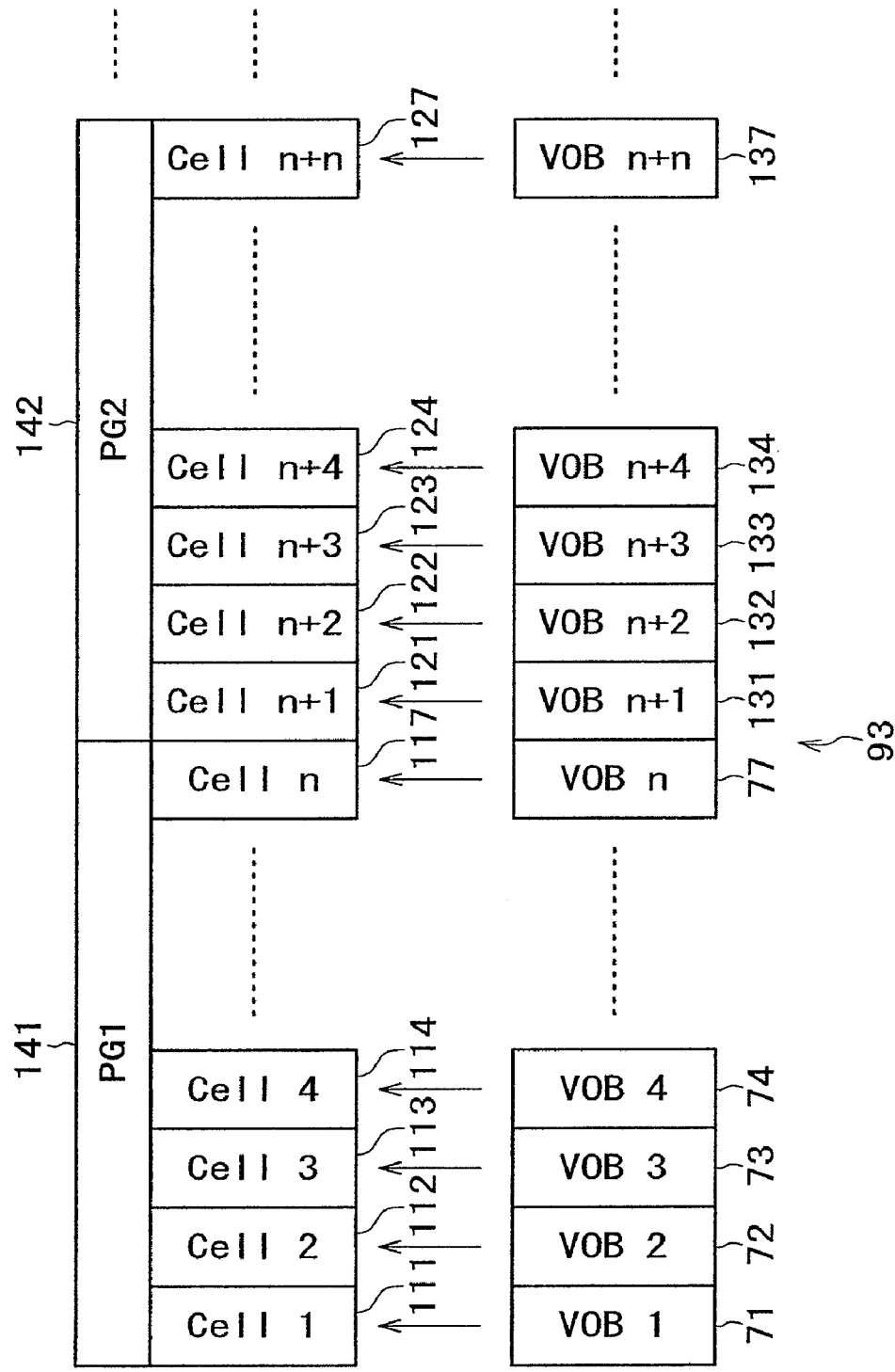
FIG. 6 is a diagram of assistance in explaining an ORG_PGCIT in FIG. 5.

An ORG_PGCIT (Original Program Chain Information Table) 93 describes programs in original reproduction order. Start points and end points of a VOB1 71, a VOB2 72, a VOB3 73, a VOB4 74, a VOB5 75, a VOB6 76, . . . , a VOBn 77 in recording order are sequentially described in a Cell1 111, a Cell2 112, a Cell3 113, a Cell4 114, . . . , a Celln 117 corresponding to the VOB1 71 to the VOBn 77, respectively, within the ORG_PGCIT 93, as shown in FIG. 6.

A continuous group of Cells is referred to as a program (PG). In the example of FIG. 6, a PG1 141 includes the Cell 111, the Cell2 112, the Cell3 113, the Cell4 114, . . . , the Celln 117, whereas a PG2 142 includes a Celln+1 121, a Celln+2 122, a Celln+3 123, a Celln+4 124, . . . , a Celln+n 127. In this case, the reproduction order is Cell number order (program number order).

Figure 7:
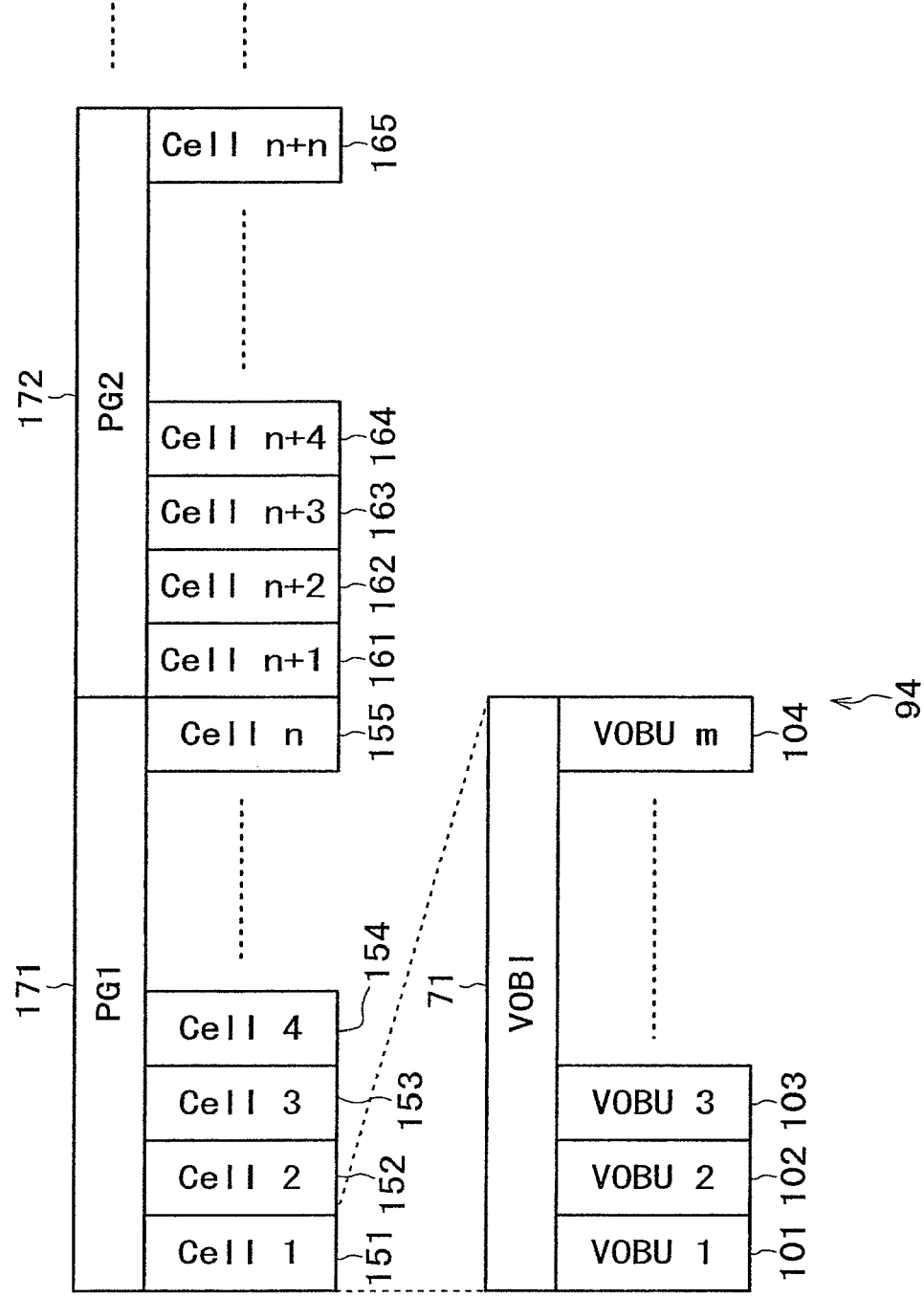
FIG. 7 is a diagram of assistance in explaining a UD_PGCIT in FIG. 5.

A UD_PGCIT (User Defined Program Chain Information Table) 94 includes a plurality of PGCIs defined by the user, and is used for editing and the like. A Cell within the UD_PGCIT 94 can describe an arbitrary start point and an arbitrary end point in VOBU (VOB Unit (corresponding to one GOP in MPEG)) unit within a VOB specified by the user. As shown in FIG. 7, for example, a Cell 151 describes an arbitrary start point and an arbitrary end point in VOBU unit as a VOBU1 101 to a VOBUm 104 within a VOB1 71. Such Cells are brought together consecutively to form a program PG1 171.

Although reproduction is performed in the Cell number order, VOBUs indicated by a Cell are not necessarily in recording order. A list (play list) in the reproduction order (for example the Cell1 151, a Cell2 152, a Cell3 153, a Cell4 154, . . . , a Celln 155) is described in PGCI.

Returning to FIG. 5, Play Data 81 describes, in VOBU unit, a reproduction start point and a reproduction end point of VOBU units reproduced by the disk camcorder 50.

Figure 3:
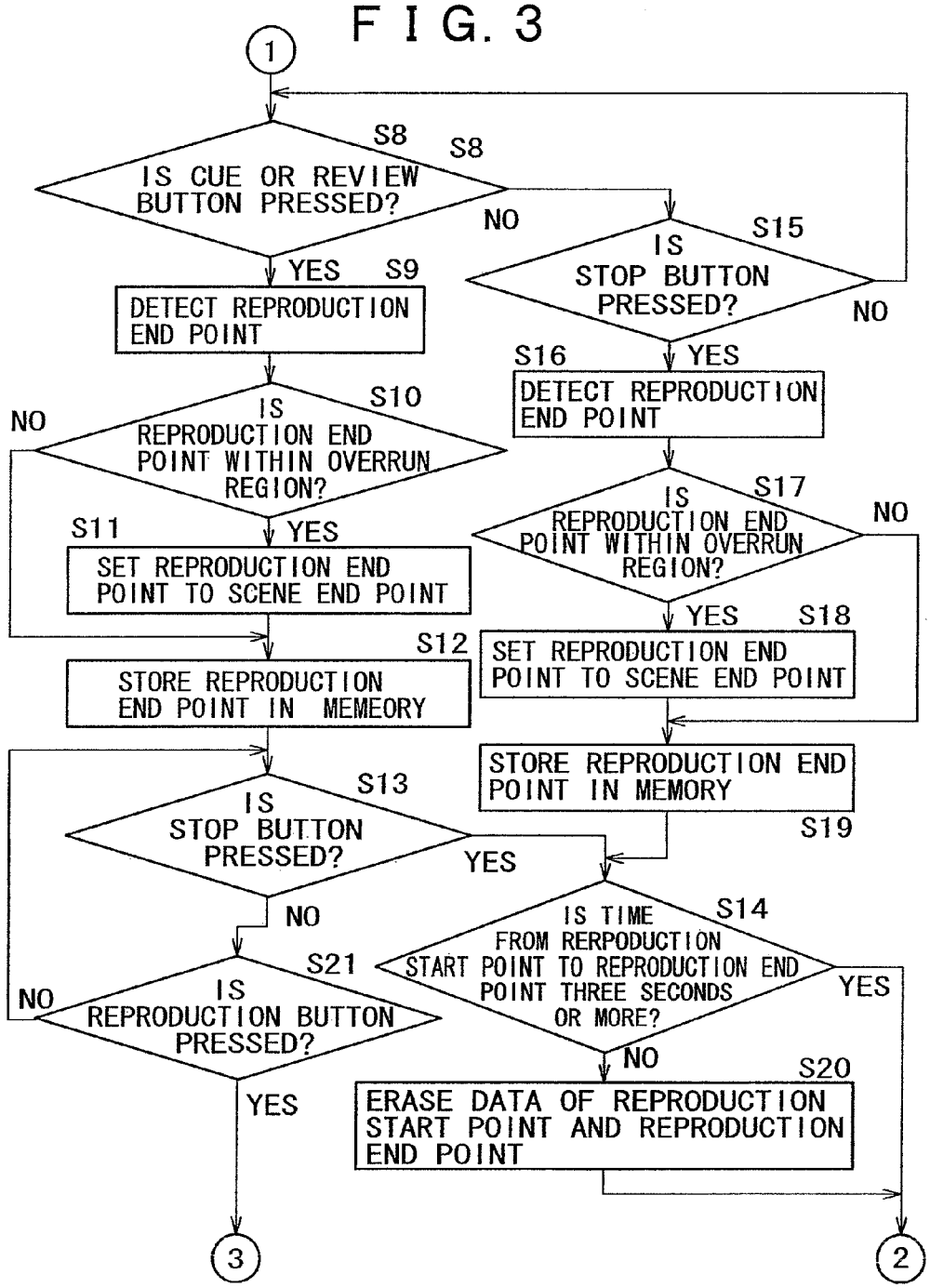
FIG. 3 is a flowchart of assistance in explaining processing of the disk camcorder of FIG. 1 for recording a reproduction start point and a reproduction end point.
Figure 4:
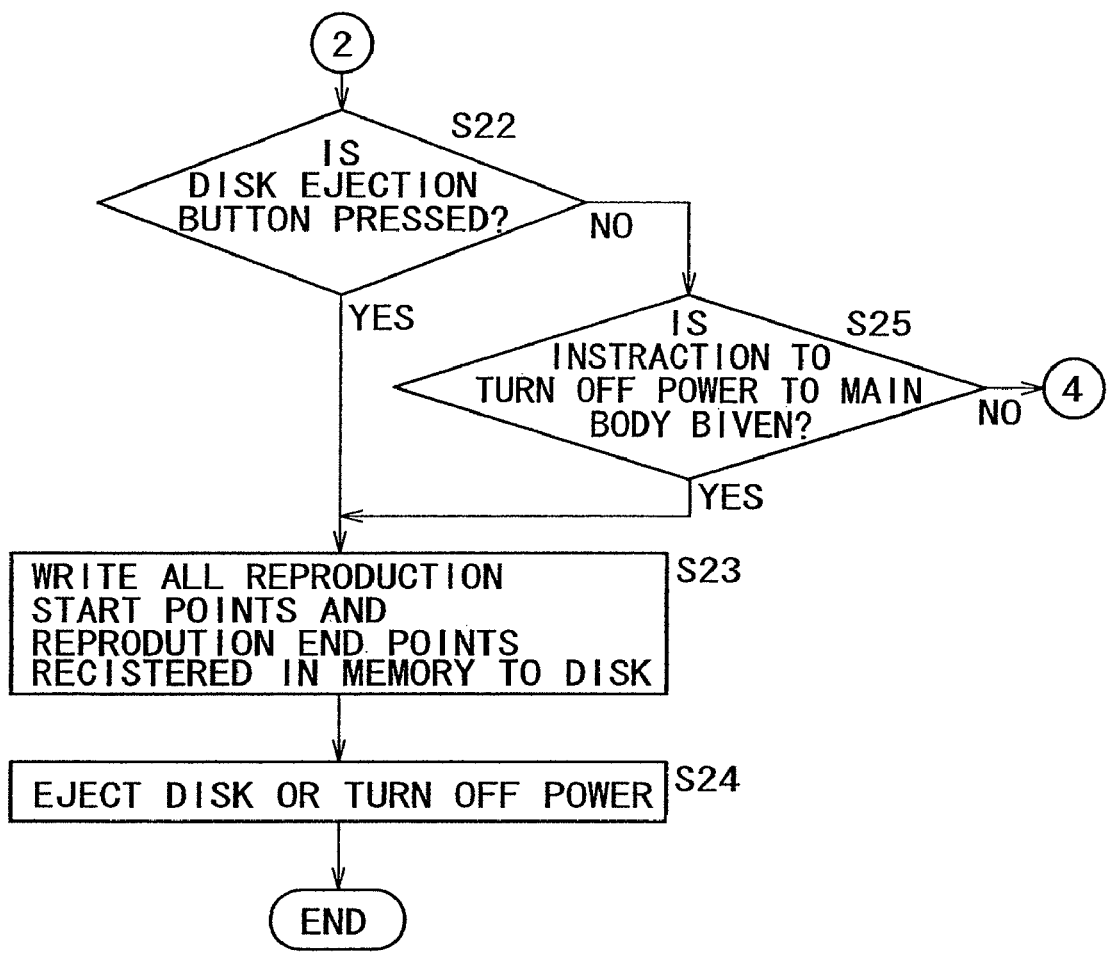
FIG. 4 is a flowchart of assistance in explaining processing of the disk camcorder of FIG. 1 for recording a reproduction start point and a reproduction end point.
Figure 5:
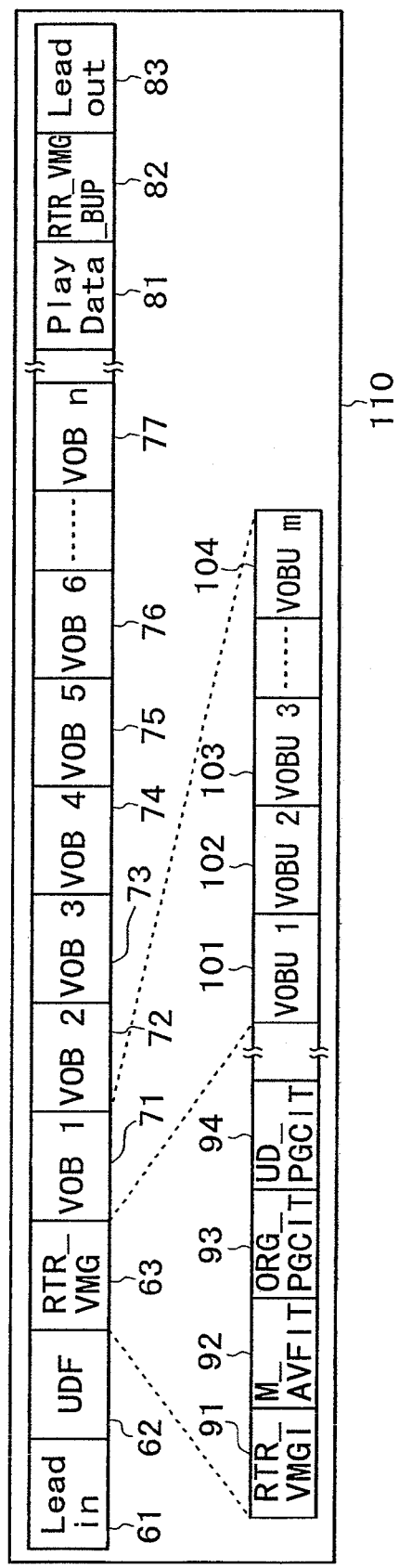
FIG. 5 is a diagram showing a structure of a disk file described by the disk camcorder of FIG. 1.

That is, when the disk camcorder 50 performs reproduction on the basis of the ORG_PGCIT 93 as shown in flowcharts of FIGS. 2 to 4, the reproduction start point and the reproduction end point are described in the Play Data 81 in the processing at the step S23. Editing is performed on the basis of the reproduction start point and the reproduction end point, and the reproduction start point and the reproduction end point after the editing are described in the UD_PGCIT 94.

A VOBU corresponding to a Cell in the ORG_PGCIT 93 and the UD_PGCIT 94 is reproduced with reference to a Time MAP within the M_AVFIT 92 where an address, size, and reproduction time of the VOBU are defined.

Incidentally, the RTR_VMG 63, the VOB1 71 to the VOBn 77, and the Play Data 81 can be assigned a start point, an end point, and size arbitrarily by the UDF. When a size assigned first is insufficient, the data can be newly set in another location.

Figure 8:
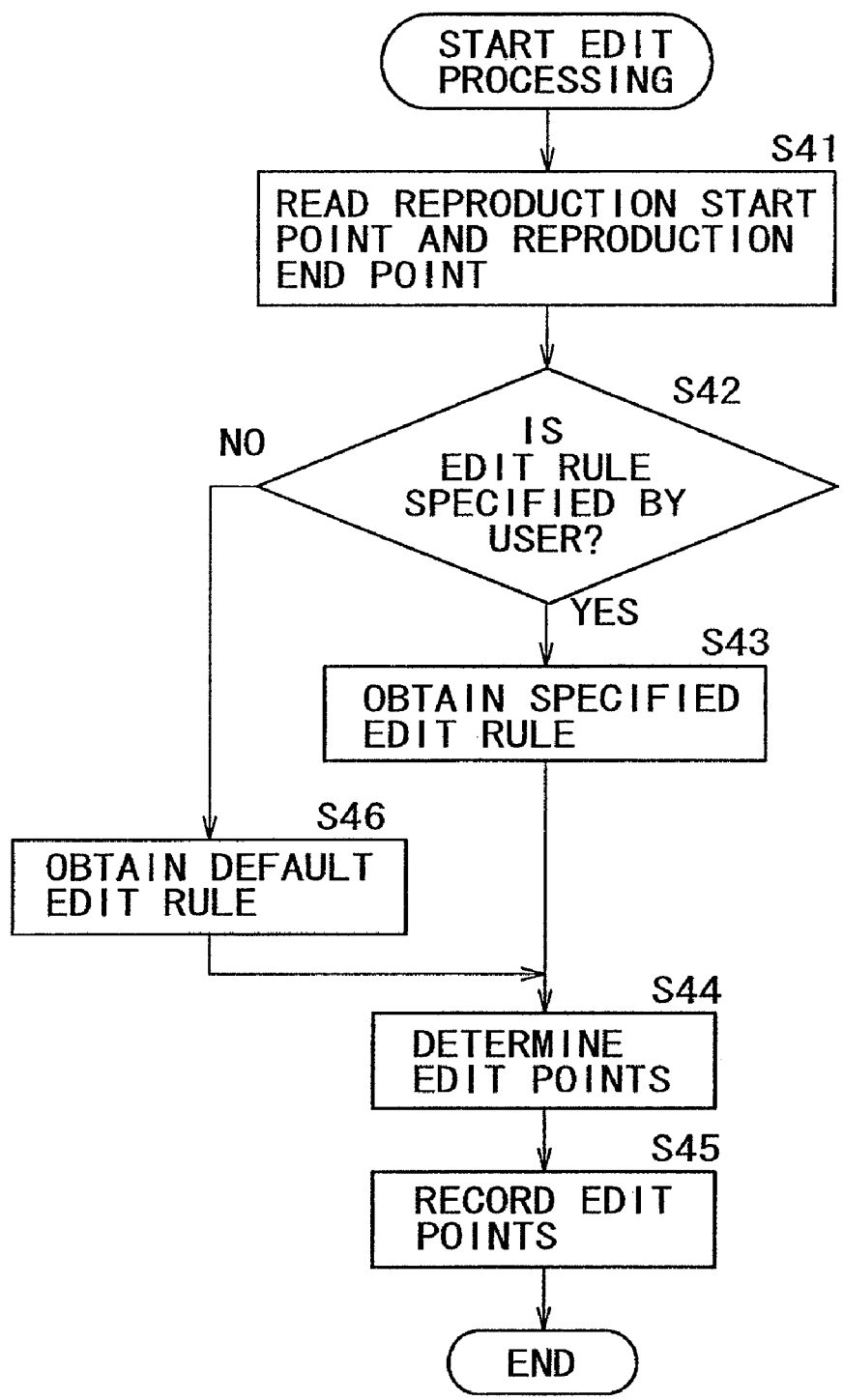
FIG. 8 is a flowchart of assistance in explaining edit processing of the disk camcorder of FIG. 1.

When the user gives an instruction for edit processing after the reproduction start point and the reproduction end point are thus recorded in the Play Data 81 of the optical disk 14, or when the optical disk 14 is loaded, or when the power to the main body is turned on in a state in which the optical disk 14 is loaded in the disk camcorder 50, edit processing is performed as shown in a flowchart of FIG. 8.

The edit processing performed by the automatic edit processing program of the disk camcorder 50 will next be described with reference to a flowchart of FIG. 8.

At a step S41, the automatic edit processing program reads the reproduction start point and the reproduction end point written to the Play Data 81 (FIG. 5) of the optical disk 14 at the step S23 in FIG. 4. At a step S42, the automatic edit processing program determines whether an edit rule is specified by the user. For example, the user can specify an edit rule that a length defined by the reproduction start point and the reproduction end point be obtained as either a longest range, a shortest range, or an average range.

When the automatic edit processing program determines that an edit rule is specified by the user, the automatic edit processing program advances the processing to a step S43 to obtain the specified edit rule.

When the automatic edit processing program determines at the step S42 that no edit rule is specified by the user, the automatic edit processing program advances the processing to a step S46 to obtain a default edit rule. In the above-mentioned example, either the longest range, the shortest range, or the average range is predefined as a default rule, and the default rule is obtained.

At a next step S44, the automatic edit processing program determines edit points from the reproduction start point and the reproduction end point written in the Play Data 81 of the optical disk 14 on the basis of the obtained edit rule. That is, on the basis of the obtained rule, points that make the longest range, the shortest range, or the average range are determined as edit points (an edit start point and an edit end point). At a step S45, the automatic edit processing program records the edit points determined at the step S44 in the UD_PGCIT 94 of the optical disk 14. The automatic edit processing program then ends the processing.

An example in which an editor performs automatic editing by using the automatic edit program according to the present invention and reproducing an image file three times will next be described with reference to FIG. 9. Incidentally, in FIG. 9, hatched portions represent overrun regions, and portions enclosed by a circle represent a reproduction for less than the generally shortest shooting time (three seconds in this case, but may be another value).

An example of a first reproduction will be described. At a step S61, a reproduction is performed from a start of a scene A to a vicinity of a start of a scene B. Then, at a step S62, a cue is performed to a vicinity of a start of a scene C. Then, at a step S63, the scene C is reproduced for a short time, and at a next step S64, a review is performed to the vicinity of the start of the scene C. Further, at a step S65, a reproduction is performed to a middle point in the scene C, and at a step S66, a cue is performed through an entire scene D to a vicinity of a start of a scene E. Then, at a step S67, the scene E is reproduced for a very short time (less than three seconds). At a step S68, a cue is performed to a middle point in the scene E directly after the step S67. Further, at a step S69, a reproduction is performed from a middle point in the scene E, and is continued as it is to a middle point in a scene F.

Thus, in the first reproduction, the scene B, a portion after the middle point in the scene C, the scene D, and a portion from the start to the middle point of the scene E are not reproduced. Thus, it is supposed that the photographer does not consider these ranges of the scenes very important.

An example of a second reproduction, shown under the example of the first reproduction, will next be described. At a step S81, a reproduction is performed from the scene A to the vicinity of the start of the scene B. Then, at a step S82, a cue is performed to the vicinity of the start of the scene C. Then, at a step S83, a reproduction is performed to a middle point in the scene C, and at a step S84, a cue is performed to a middle point in the scene E. Further, at a step S85, a reproduction is performed to a middle point in the scene F.

An example of a third reproduction will be described. At a step S101, a reproduction is performed to a middle point of the scene A. At a step S102, a cue is performed through the scenes B, C, and D to a middle point in the scene E. Then, after the scene E is reproduced for a very short time at a step S103, a review is performed to a middle point in the scene E at a step S104. Further, at a step S105, a reproduction is performed to a middle point in the scene F.

Reproduction start points and reproduction end points stored in the Play Data 81 of the optical disk 14 as a result of the first reproduction will be described with reference to FIG. 10. Incidentally, a VOBU unit has a duration of 0.5 seconds, and an overrun region represents a scene change point ±3 seconds.

At the step. S61, the reproduction is performed from a VOBU1 of a VOB1 to a VOBU4 of a VOB2 (from the scene A to the vicinity of the start of the scene B). Since the VOBU4 of the VOB2 is within an overrun region, a reproduction start point of the VOB1 to be registered is the VOBU1, and a reproduction end point of the VOB1 is a VOBU40, which is an end of the VOB1 (scene A). That is, a section 181 from the VOBU1 to the VOBU40 is registered as a reproduced section. Similarly, at the step S65, a section from a VOBU20 of the VOB2 to a VOBU40 of a VOB3 (from the vicinity of the start of the scene C to the middle point in the scene C) is reproduced. Since the VOBU20 of the VOB2 is within an overrun region, the VOBU20 of the VOB2 is not registered as a reproduction start point; a VOBU1 of the VOB3, which is the start of the VOB3 (scene C), is registered as a reproduction start point. The VOBU40 of the VOB3 is registered as it is as a reproduction end point. That is, in this case, a section 182 from the VOBU1 to the VOBU40 of the scene C is registered as a reproduced section.

At the step S67, the reproduction is performed from a VOBU5 to a VOBU10 of a VOB5 (a very short section of the scene E). However, since the reproduction time is less than three seconds (the generally shortest reproduction time), it is not determined that the reproduction has been performed, and thus the reproduction start point and the reproduction end point are not registered.

At the step S69, the reproduction is performed from a VOBU35 of a VOB5 to a VOBU25 of a VOB6 (from the middle point in the scene E to the middle point in the scene F). Therefore, the VOBU35 of the VOB5 (scene E) is registered as a reproduction start point, and the VOBU25 of the VOB6 (scene F) is registered as a reproduction end point. That is, a section 183 from the VOBU35 to a VOBU46 of the VOB5 and a section 184 from a VOBU1 to the VOBU25 of the VOB6 are registered as a reproduced section.

By performing similar processing on data of the second reproduction and the third reproduction, accumulated data as shown in FIG. 9 is stored in the Play Data 81 of the optical disk 14. Specifically, reproduced sections registered as a result of the second reproduction are the scene A, a section from the start of the scene C (because the reproduction start point is in the overrun region) to the end point of the reproduction, and reproduced sections of the scene E and the scene F. Reproduced sections registered as a result of the third reproduction are the scene A, and sections of the scene E and the scene F which sections are reproduced at the step S105. Since a section of the scene E which section has been reproduced at the step S103 is of a duration less than three seconds, it is not determined that the section has been reproduced, and the section is not registered.

FIG. 11 shows an example of a table of data accumulated in the Play Data 81 of the optical disk 14. For one reproduction, four bytes of data 201 (VOB n) indicating a number of a VOB reproduced during the reproduction, four bytes of data 202 (VOBU_S) indicating a VOBU number of the reproduction start point, and four bytes of data 203 (VOBU_E) indicating a VOBU number of the reproduction end point are provided. Further, four bytes is provided as Reserve 204 for future use. A total of 16 bytes represents one reproduced section.

In the case of the section 181 in FIG. 10, for example, "1" is written in the VOBn 201; "1" is written in the VOBU_S 202; and "40" is written in the VOBU_E 203.

Referring to the data of the three reproductions which data is thus accumulated in the Play Data 81, images are automatically edited on the basis of the edit rule. When a rule to set a reproduction start point and a reproduction end point to those of a longest reproduction time is selected as the edit rule, for example, reproduction based on a result of the edit is such as a first example of reproduction after an edit in FIG. 9. Similarly, when a rule to set a reproduction start point and a reproduction end point to those of an average reproduced section, or a rule to set a reproduction start point and a reproduction end point to those of a short reproduction time is selected as the edit rule, reproduction based on a result of the edit is such as a second example of reproduction after an edit or a third example of reproduction after an edit, respectively, in FIG. 9.

Thus, while automatic editing can be performed with only one reproduction, an edit result more reflective of an intention of the photographer can be obtained by accumulating a plurality of data, such as data of two reproductions, three reproductions or the like. As another edit rule, a weighting rule can be set. In the case of FIG. 9, for example, the scene C is reproduced less frequently than the scene A, the scene E, and the scene F, and therefore the scene C can be assigned a smaller weight than the scene A, the scene E, and the scene F. Thus, when a total time after editing is fixed, a reproduced section of low priority (weight) is deleted from edited scenes, so that an edit result such for example as a fourth example of reproduction after an edit in FIG. 9 is obtained.

Reproduction processing after editing which processing is performed by the automatic edit processing program of the disk camcorder 50 will next be described with reference to a flowchart of FIG. 12. This processing is started when the user turns on the automatic edit reproduction mode button 36 and operates the reproduction button 31.

When the automatic edit reproduction mode button 36 is turned on, the automatic edit processing program sets an automatic edit reproduction mode. At a step S121, the automatic edit processing program reads the edit points recorded in the UD_PGCIT 94 in FIG. 5 from the optical disk 14. The edit points are recorded by the processing at the step S45 in FIG. 8. At a step S122, the automatic edit processing program reproduces edited images on the basis of the edit points with reference to the Time MAP of the M_AVFIT 92 in FIG. 5 where the VOBU address, size, and reproduction time are defined. Thus, reproduction as shown as the first to fourth examples of reproduction after editing in FIG. 9 is performed.

Specifically, the system controlling micon 8 outputs a request to reproduce the read edit point to the drive controlling micon 11. On the basis of this request, the drive controlling micon 11 controls the servo circuit 13 to move the optical pickup 16 to the edit point. The optical pickup 16 irradiates the position of the edit point on the optical disk 14 with a laser beam for reproduction, and converts light reflected from the optical disk 14 into a reproduced signal by the photodetector.

The reproduced signal is sequentially supplied to the data modulator/demodulator 12 and the error correction encoder/decoder 10 to be subjected to demodulation, deinterleaving processing, and error correction processing. Then, the memory controller 7 once writes the reproduced signal as reproduced data to the memory 6. The reproduced data is supplied to the file decoder 17 to be separated into a video elementary stream and an audio elementary stream. The video elementary stream is supplied to the video decoder 18, and the audio elementary stream is supplied to the audio decoder 20 such that the video elementary stream and the audio elementary stream are synchronized with each other.

The video decoder 18 and the audio decoder 20 each perform decoding for compression coding. The video decoder 18 and the audio decoder 20 then output a video output signal to the LCD (liquid crystal display) 19 and an audio output signal to the speaker 21, respectively. Thus, video and audio after editing are reproduced.

While a case where the present invention is applied to a disk camcorder is taken as an example, the present invention is applicable to apparatus for reproducing contents such as video, audio and the like when the contents are recorded on an information recording medium such as a disk, a tape, a semiconductor memory or the like.

The series of processes described above can be carried out not only by hardware but also by software. When the series of processes is to be carried out by software, a program comprising the software is installed from a network or a recording medium onto a disk camcorder that is incorporated in dedicated hardware, or for example a general-purpose disk camcorder or the like that can perform various functions by installing various programs thereon.

As shown in FIG. 1, the recording medium is not only formed by packaged media distributed to users to provide the program separately from the apparatus proper, the packaged media comprising the magnetic disk 41, the optical disk 42, the magneto-optical disk 43, the magneto-optical disk 63, the semiconductor memory 44 or the like which has the program recorded thereon, but also formed by the memory 6, the semiconductor memory included in the storage unit 23 or the like which has the program recorded thereon and which is provided to the user in a state of being preincorporated in the apparatus proper.

It is to be noted that in the present specification, the steps describing the program recorded on the recording medium include not only processing carried out in time series in the described order but also processing carried out in parallel or individually and not necessarily in time series.

Also, in the present specification, a system refers to an apparatus as a whole formed by a plurality of apparatus.

Industrial Applicability

As described above, according to the present invention, it is possible to automatically edit contents. Also, the editing can be performed easily. Further, an edit result reflective of an intention of an editor can be produced.

The invention claimed is:

1. A content reproducing apparatus for reproducing content recorded on an information recording medium, said apparatus comprising:
    first determining means for determining whether reproduction of said content is started;
    first detecting means for detecting a reproduction start position when said first determining means determines that the reproduction of said content is started;
    second determining means for determining whether the reproduction of said content is stopped;
    second detecting means for detecting a reproduction end position when said second determining means determines that the reproduction of said content is stopped;
    storing means for storing said reproduction start position and said reproduction end position; and
    third determining means for automatically determining an edit point after reproduction of said content by a user based on said reproduction start position, said reproduction end position and a scene change point.

2. A content reproducing apparatus as claimed in claim 1, further comprising recording means for recording said reproduction start position and said reproduction end position stored in said storing means onto said information recording medium.

3. A content reproducing apparatus as claimed in claim 2, further comprising:
    reproducing means for reproducing said reproduction start position and said reproduction end position recorded on said information recording medium; and said third determining means for determining the edit point on the basis of said reproduction start position and said reproduction end position reproduced by said reproducing means.

4. A content reproducing apparatus as claimed in claim 3, wherein
said third determining means weights a plurality of said reproduction start positions and a plurality of said reproduction end positions reproduced by said reproducing means and determines said edit point.

5. A content reproducing apparatus as claimed in claim 3, wherein
said recording means further records said edit point determined by said third determining means onto said information recording medium.

6. A content reproducing apparatus as claimed in claim 5, wherein
said reproducing means further reproduces said edit point recorded on said information recording medium and reproduces said content recorded on said information recording medium on the basis of the reproduced said edit point.

7. A content reproducing apparatus as claimed in claim 1, wherein
said first detecting means determines whether an actual said reproduction start position is situated within a predetermined region, and detects a nearest scene start point as said reproduction start position when said first detecting means determines that the actual said reproduction start position is situated within the predetermined region.

8. A content reproducing apparatus as claimed in claim 1, wherein
said second detecting means determines whether said reproduction end position is situated within a predetermined region, and detects a nearest scene end point as said reproduction end position when said second detecting means determines that said reproduction end position is situated within the predetermined region.

9. A content reproducing apparatus as claimed in claim 1, further comprising a fourth determining means for determining whether a time between said reproduction start position and said reproduction end position is longer than a predetermined reference value,
wherein said storing means stores said reproduction start position and said reproduction end position when said fourth determining means determined that the time between said reproduction start position and said reproduction end position is longer than said reference value.

10. A content reproducing apparatus as claimed in claim 9, wherein
said storing means does not store said reproduction start position and said reproduction end position when said fourth determining means determines that the time between said reproduction start position and said reproduction end position is shorter than said reference value.

11. A content reproducing method for a content reproducing apparatus, said content reproducing apparatus reproducing content recorded on an information recording medium, said method comprising the steps of:
a first determining step for determining whether reproduction of said content is started;
a first detecting step for detecting a reproduction start position when it is determined by processing of said first determining step that the reproduction of said content is started;
a second determining step for determining whether the reproduction of said content is stopped;
a second detecting step for detecting a reproduction end position when it is determined by processing of said second determining step that the reproduction of said content is stopped;
a storing controlling step for controlling storing said reproduction start position and said reproduction end position; and
a third determining step for automatically determining an edit point after reproduction of said content by a user based on said reproduction start position, said reproduction end position and a scene change point.

12. A non-transitory computer-readable medium encoded with a computer program for a content reproducing apparatus, said content reproducing apparatus reproducing content recorded on an information recording medium, said computer program comprising the steps of:
a first determining step for determining whether reproduction of said content is started;
a first detecting step for detecting a reproduction start position when it is determined by processing of said first determining step that the reproduction of said content is started;
a second determining step for determining whether the reproduction of said content is stopped;
a second detecting step for detecting a reproduction end position when it is determined by processing of said second determining step that the reproduction of said content is stopped;
a storing controlling step for controlling storing said reproduction start position and said reproduction end position; and
a third determining step for automatically determining an edit point after reproduction of said content by a user based on said reproduction start position, said reproduction end position and a scene change point.

13. A non-transitory computer program product embodied on a computer-readable medium for making a computer controlling a content reproducing apparatus, said content reproducing apparatus reproducing content recorded on an information recording medium, said processing comprising computer readable instructions for performing the steps of:
a first determining step for determining whether reproduction of said content is started;
a first detecting step for detecting a reproduction start position when it is determined by processing of said first determining step that the reproduction of said content is started;
a second determining step for determining whether the reproduction of said content is stopped;
a second detecting step for detecting a reproduction end position when it is determined by processing of said second determining step that the reproduction of said content is stopped;
a storing controlling step for controlling storing said reproduction start position and said reproduction end position; and
a third determining step for automatically determining an edit point after reproduction of said content by a user based on said reproduction start position, said reproduction end position and a scene change point.

14. A content reproducing apparatus for reproducing content recorded on an information recording medium, said apparatus comprising:
first determining device determining whether reproduction of said content is started;

first detecting device detecting a reproduction start position when said first determining device determines that the reproduction of said content is started;

second determining device determining whether the reproduction of said content is stopped;

second detecting device detecting a reproduction end position when said second determining device determines that the reproduction of said content is stopped;

storing device storing said reproduction start position and said reproduction end position; and third determining device automatically determining an edit point after reproduction of said content by a user based on said reproduction start position, said reproduction end position and a scene change point.

15. A content reproducing apparatus as claimed in claim 14, further comprising recording device recording said reproduction start position and said reproduction end position stored in said storing device onto said information recording medium.

16. A content reproducing apparatus as claimed in claim 15, further comprising:

reproducing device reproducing said reproduction start position and said reproduction end position recorded on said information recording medium; and said third determining device determining the edit point on the basis of said reproduction start position and said reproduction end position reproduced by said reproducing device.

17. A content reproducing apparatus as claimed in claim 16, wherein said third determining device weights a plurality of said reproduction start positions and a plurality of said reproduction end positions reproduced by said reproducing device and determines said edit point.

18. A content reproducing apparatus as claimed in claim 16, wherein said recording device further records said edit point determined by said third determining device onto said information recording medium.

19. A content reproducing apparatus as claimed in claim 18, wherein said reproducing device further reproduces said edit point recorded on said information recording medium and reproduces said content recorded on said information recording medium on the basis of the reproduced said edit point.

20. A content reproducing apparatus as claimed in claim 14, wherein said first detecting device determines whether an actual said reproduction start position is situated within a predetermined region, and detects a nearest scene start point as said reproduction start position when said first detecting device determines that the actual said reproduction start position is situated within the predetermined region.

21. A content reproducing apparatus as claimed in claim 14, wherein said second detecting device determines whether said reproduction end position is situated within a predetermined region, and detects a nearest scene end point as said reproduction end position when said second detecting device determines that said reproduction end position is situated within the predetermined region.

22. A content reproducing apparatus as claimed in claim 14, further comprising a fourth determining device determining whether a time between said reproduction start position and said reproduction and position is longer than a predetermined reference value, wherein said storing device stores said reproduction start position and said reproduction end position when said fourth determining device determines that the time between said reproduction start position and said reproduction end position is longer than said reference value.

23. A content reproducing apparatus as claimed in claim 22, wherein said storing device does not store said reproduction start position and said reproduction end position when said fourth determining device determines that the time between said reproduction start position and said reproduction end position is shorter than said reference value.

* * * * *